US011507608B2

(12) United States Patent
Agrawal et al.

(10) Patent No.: US 11,507,608 B2
(45) Date of Patent: Nov. 22, 2022

(54) SYSTEM FOR IMPROVING SEARCH ENGINE RANKING OF A LANDING PAGE USING AUTOMATED ANALYSIS OF LANDING PAGES OF THIRD-PARTY ENTITIES

(71) Applicant: Dell Products L.P., Round Rock, TX (US)

(72) Inventors: Siddharth Agrawal, Sambalpur (IN); Ashish Kumar Palo, Koraput (IN); Mehak Preet, Karnal (IN); Kabya Koel Kar, Bhubaneswar (IN); Wasim Bari, Cuttack (IN)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 16/256,426

(22) Filed: Jan. 24, 2019

(65) Prior Publication Data

US 2020/0242147 A1 Jul. 30, 2020

(51) Int. Cl.
*G06F 16/33* (2019.01)
*G06F 16/31* (2019.01)
*G06F 16/9538* (2019.01)

(52) U.S. Cl.
CPC ........ *G06F 16/3334* (2019.01); *G06F 16/319* (2019.01); *G06F 16/3344* (2019.01); *G06F 16/9538* (2019.01)

(58) Field of Classification Search
CPC ............. G06F 16/3334; G06F 16/3344; G06F 16/9538; G06F 16/319
See application file for complete search history.

(56) References Cited

U.S. PATENT DOCUMENTS

| 8,869,019 | B1* | 10/2014 | Sampath-Kumar ......................... G06F 40/134 715/208 |
| 2005/0038894 | A1* | 2/2005 | Hsu ........................ G06F 16/958 709/228 |
| 2005/0278325 | A1* | 12/2005 | Mihalcea .............. G06F 40/284 |

(Continued)

OTHER PUBLICATIONS

Banerjee, "Adapting the Lesk Algorithm for Word Sense Disambiguation to WordNet", 2002 (Year: 2002).*

(Continued)

*Primary Examiner* — Dawaune A Conyers
(74) *Attorney, Agent, or Firm* — Terrile, Cannatti & Chambers; Stephen A. Terrile

(57) ABSTRACT

A method, system and computer-usable medium are disclosed for improving search engine ranking of a landing page using automated analysis of landing pages of third-party entities. Certain embodiments include receiving, at a user interface, a primary keyword associated with a targeted landing page of a primary entity; transmitting the primary keyword to a search engine; and receiving a search engine results page from the search engine. The search engine results page may be used to identify landing pages of third-party entities having a higher rank than the targeted landing page. Secondary keywords occurring on the third-party landing pages may be identified and analyzed to determine whether inclusion of the secondary keyword in the targeted landing page will increase ranking of the targeted landing page in the search engine.

20 Claims, 5 Drawing Sheets

(56) References Cited

U.S. PATENT DOCUMENTS

| | | | | |
|---|---|---|---|---|
| 2008/0065440 A1* | 3/2008 | Graham | ................ | G06Q 30/02 |
| | | | | 705/7.33 |
| 2008/0243797 A1* | 10/2008 | Song | ................ | G06Q 30/0253 |
| 2009/0171721 A1* | 7/2009 | LeBaron | ............... | G06F 16/951 |
| | | | | 705/14.54 |
| 2010/0145678 A1* | 6/2010 | Csomai | ................ | G06F 40/268 |
| | | | | 704/9 |
| 2011/0016104 A1* | 1/2011 | Leconte | ................ | G06F 16/335 |
| | | | | 707/706 |
| 2013/0046747 A1* | 2/2013 | Gouyet | ............. | G06Q 30/0242 |
| | | | | 707/709 |
| 2013/0173574 A1* | 7/2013 | Park | ...................... | G06F 16/951 |
| | | | | 707/706 |
| 2013/0173783 A1* | 7/2013 | Yu | ........................ | H04L 47/2441 |
| | | | | 709/224 |
| 2015/0052126 A1* | 2/2015 | Bordino | .............. | G06F 16/9535 |
| | | | | 707/725 |
| 2015/0088846 A1* | 3/2015 | Roe | ........................ | G06F 16/958 |
| | | | | 707/706 |
| 2015/0106510 A1* | 4/2015 | Yu | ........................ | G06Q 30/0201 |
| | | | | 709/224 |
| 2020/0192960 A1* | 6/2020 | Luo | ..................... | G06F 11/3006 |

OTHER PUBLICATIONS

Antoniou et al., "Dynamic refinement of search engines results utilizing the user intervention" 2012 (Year: 2012).*

* cited by examiner

SYSTEM FOR IMPROVING SEARCH ENGINE RANKING OF A LANDING PAGE USING AUTOMATED ANALYSIS OF LANDING PAGES OF THIRD-PARTY ENTITIES

BACKGROUND OF THE INVENTION

Field of the Invention

Embodiments of the invention relate generally to information handling systems. More specifically, embodiments of the invention provide a method and system for improving search engine ranking of a landing page using automated analysis of landing pages of third-party entities, such as competitors.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

These same information handling systems have played a key role in the rapid growth of electronic commerce on the Internet. Consumers frequently use search engines when seeking out information relating to a product or service that the consumer wishes to purchase or research. One manner in which an entity can compete in the electronic commerce marketplace is by ensuring that consumers looking for a product or service are directed to the webpages of the entity. When a consumer enters a search term relating to the product or service that they are seeking out, the search engine returns a results page listing of HTML links to webpages that the consumer may go to in order to find the requested information. These links to the webpages (i.e., landing pages associated with the search term) are presented to the consumer in the order in which the webpages have been ranked by the search provider. Statistically, consumers are more likely to go to and purchase goods or services from a higher ranked landing page than a lower ranked landing page. As such, entities seek to have their landing pages for a searched product or service ranked higher than the landing pages of their competitors.

SUMMARY OF THE INVENTION

A method, system and computer-usable medium are disclosed for improving search engine ranking of a targeted landing page using automated analysis of landing pages of third-party entities. The system may include one or more computers that can be configured to perform particular operations or actions by virtue of having software, firmware, hardware, or a combination of them installed on the system that in operation causes or cause the system to improve the search engine ranking of the targeted landing page. One or more computer programs can be configured to perform particular operations or actions by virtue of including instructions that, when executed by data processing apparatus, cause the apparatus to improve the search engine ranking of a landing page using automated analysis of landing pages of third-party entities. Certain embodiments include a computer-implemented method for improving search engine ranking of a landing page, including: receiving, at a user interface, a primary keyword associated with a targeted landing page of a primary entity; transmitting the primary keyword to a search engine; receiving a search engine results page from the search engine; using the search engine results page to identify landing pages of one or more third-party entities having a higher rank than the targeted landing page; identifying at least one secondary keyword semantically related to the primary keyword on one or more of the landing pages of the one or more third-party entities, and determining whether inclusion of the secondary keyword in the targeted landing page will increase ranking of the targeted landing page in the search engine. Other embodiments of this aspect of the invention may include corresponding stand-alone and/or network computer systems, apparatus, and computer programs recorded on one or more computer storage devices, each configured to perform one or more of these actions.

Certain embodiments include a system including: a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: receiving, at a user interface, a primary keyword associated with a targeted landing page of a primary entity. The system also includes transmitting the primary keyword to a search engine. The system also includes receiving a search engine results page from the search engine. The system also includes using the search engine results page to identify landing pages of one or more third-party entities having a higher rank than the targeted landing page. The system also includes identifying at least one secondary keyword semantically related to the primary keyword on one or more of the landing pages of the one or more third-party entities. The system also includes determining whether inclusion of the secondary keyword in the targeted landing page will increase ranking of the targeted landing page in the search engine. Other embodiments of this aspect of the invention may include corresponding stand-alone and/or network computer systems, apparatus, and computer programs recorded on one or more computer storage devices, each configured to perform one or more of these actions.

Certain embodiments include a non-transitory, computer-readable storage medium embodying computer program code, the computer program code including computer executable instructions configured for: receiving, at a user interface, a primary keyword associated with a targeted landing page of a primary entity; transmitting the primary keyword to a search engine; receiving a search engine results page from the search engine; using the search engine results page to identify landing pages of one or more third-party entities having a higher rank than the targeted landing page; identifying at least one secondary keyword semantically related to the primary keyword on one or more of the landing pages of the one or more third-party entities, and determining whether inclusion of the secondary keyword in the targeted landing page will increase ranking of the targeted landing page in the search engine. Other embodiments of this aspect of the invention may include corresponding stand-alone and/or network computer systems, apparatus, and computer programs recorded on one or more computer storage devices, each configured to perform one or more of these actions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
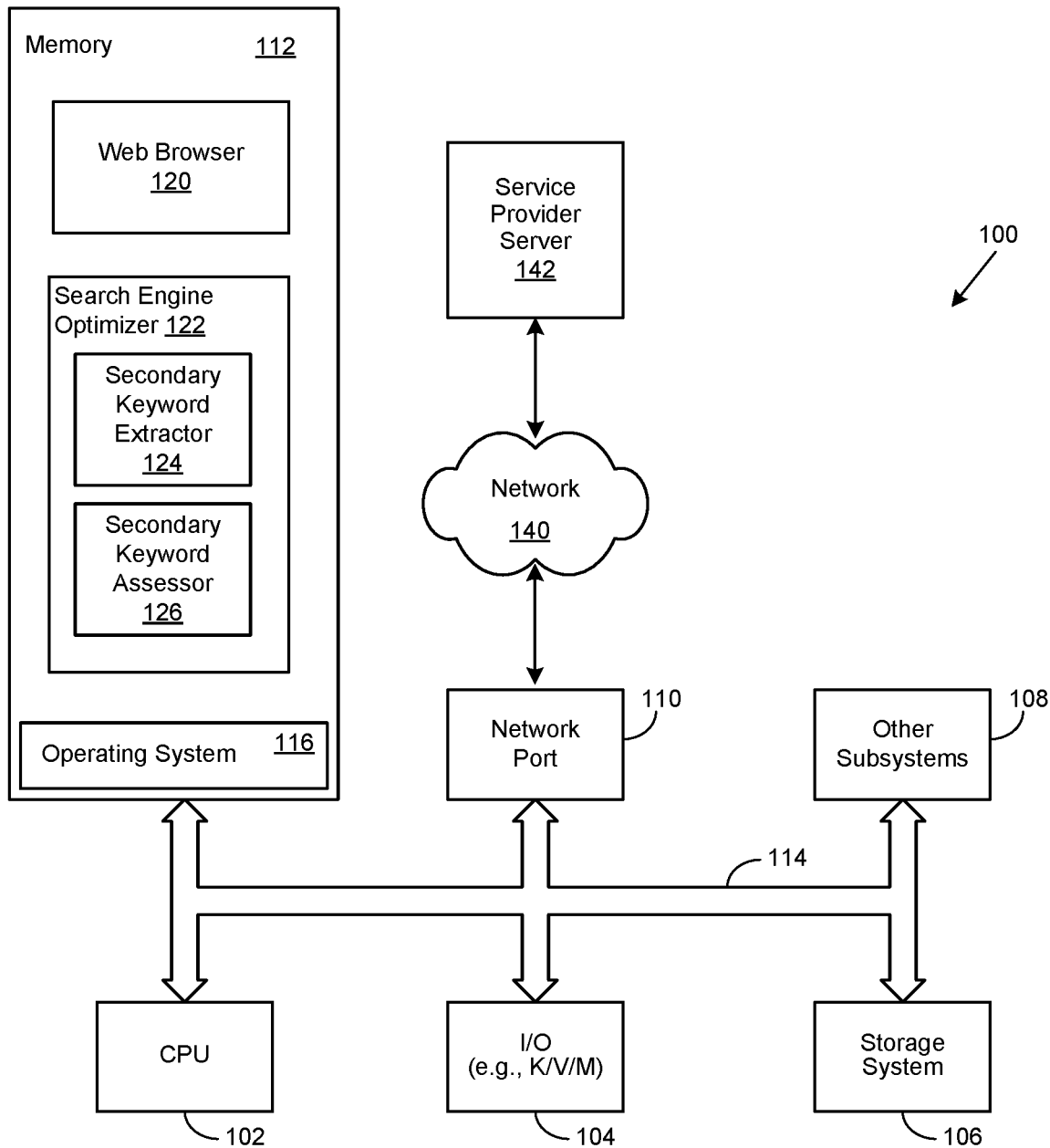
FIG. 1 is a generalized illustration of the components of an information handling system that may be used in the implementation of the system and method of the present invention.

A method and system are disclosed for improving search engine ranking of a targeted landing page of a primary entity using automated analysis of landing pages of third-party entities, such as the landing pages of competitors of the primary entity. Certain aspects of the present disclosure recognize that the page rank of a particular landing page is susceptible to change due to a host of on-page factors like browser title, hl tag, meta keywords and meta description. Ranking impacts revenue in that a landing page that is ranked higher than other landing pages for the same keyword search typically attracts more consumer traffic. Certain aspects of the present disclosure appreciate that the use of particular keywords in the on-page factors may increase the rank of a targeted landing page of the primary entity. For purposes of the following disclosure, a "targeted landing page" is the webpage to which the primary entity wishes to direct consumer traffic in response to a search using a string or phrase (collectively referenced herein as a "keyword" or "keywords). In order to optimally compete in the electronic commerce marketplace, the primary entity typically seeks to have its targeted landing page for the searched keyword ranked higher by the search provider than landing pages for the searched keyword of its competitors.

Certain aspects of the present invention also appreciate that existing solutions frequently require guesswork in determining whether use of particular keywords will increase the ranking of the landing page. More particularly, existing solutions look only for the search volume and CPC of a keyword selected from a generic keyword pool, but do not consider the importance of a keyword in a particular context. As such, the keywords selected from the generic keyword pool may be irrelevant to the primary entity's website and may not provide any competitive advantage in its ranking by the search engine provider. Accordingly, certain embodiments of the present disclosure use competitive analysis rather than a generic keyword pool to select keywords, thereby making the selection of keywords for the on-page factors more robust, effective and optimal. In certain embodiments, the keywords obtained through competitive analysis may be added to a targeted landing page of the primary entity.

Certain aspects of the present invention employ information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a web browser 120 and a search engine optimizer 122. In certain embodiments, the search engine optimizer 122 may include a secondary keyword extractor 124 and a secondary keyword assessor 126.

In certain embodiments, a primary keyword relating to a product or good sold by a primary entity is entered into the web browser 120. The primary keyword may be provided from the web browser 120 to a search engine, such as Google®, Bing®, or other search engine available to consumers of the product or good. In certain embodiments, the search engine returns one or more search engine results pages to the web browser 120. In certain embodiments, the search engine results pages have HTML links to multiple webpages relating to the primary keyword. In certain embodiments, the HTML links are presented in a ranked order and may include the targeted landing page as well as landing pages of third-party entities, such as the landing pages of competitors of the primary entity. Certain aspects of the present disclosure recognize that landing pages of third-party entities ranked higher than the targeted landing page for searches using the primary keyword may include secondary keywords that are semantically related to the primary keyword. Certain aspects of the present disclosure recognize that inclusion of certain secondary keywords in the on-page content of the targeted landing page may assist in increasing the ranking of the targeted landing page with respect to third-party landing pages, such as the landing pages operated by competitors of the primary entity. Certain embodiments of this disclosure recognize that such targeted competitor recognizance for secondary keywords may be more effective than a general search of non-directed, generic keywords from a common keyword pool that may be irrelevant.

In certain embodiments, the secondary keyword extractor 124 extracts secondary keywords that are semantically related to the primary keyword from the third-party landing pages identified in the search engine results page. In certain embodiments, the secondary keyword assessor 126 implements operations to determine whether the addition of a particular secondary keyword to the on-page content of the targeted landing page has the potential for increasing the ranking of the targeted landing page with respect to the third-party landing pages. If so, the secondary keyword is considered as a candidate for inclusion in the targeted landing page. In certain embodiments, secondary keywords likely to increase the ranking of the targeted landing page may be presented on a user interface of a search engine optimizer for selective inclusion in the targeted landing page by a human user. In certain embodiments, secondary keywords likely to increase the ranking of the targeted landing page may be automatically added to the targeted landing page through an automated HTML page editor.

In one embodiment, the information handling system 100 is able to download the search engine optimizer 122 from the service provider server 142. In another embodiment, the search engine optimizer 122 is provided as a service from the service provider server 142.

Figure 2:
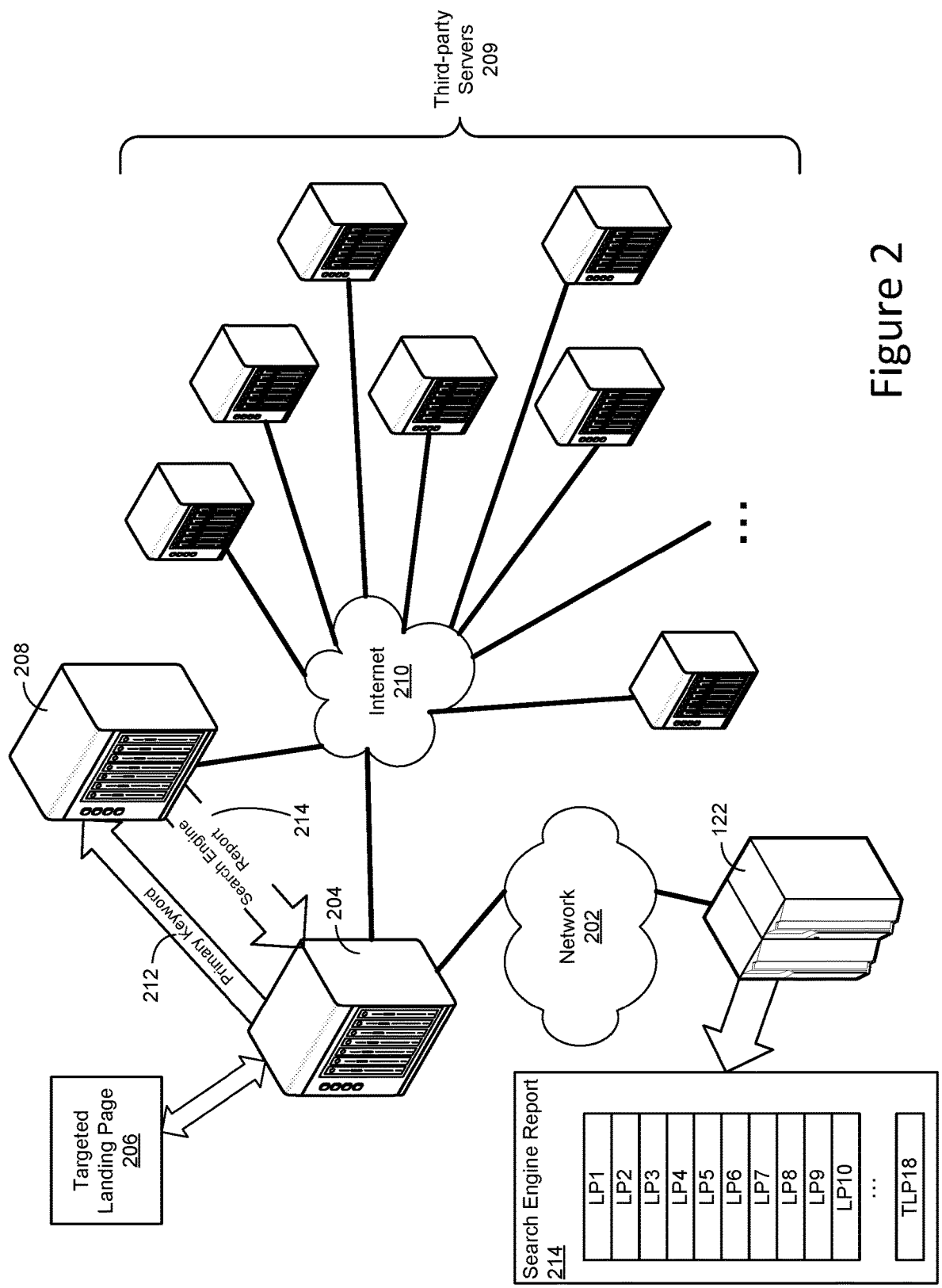
FIG. 2 shows an electronic environment in which certain embodiments of the search engine optimizer may operate.

FIG. 2 shows an electronic environment in which certain embodiments of the search engine optimizer 122 may operate. In certain embodiments, the search engine optimizer 122 is in electronic communication over a network 202 with a website server 204 of the primary entity. In certain embodiments, the website server 204 hosts the targeted landing page 206. In certain embodiments, the search engine optimizer 122 may be included as part of the website server 204.

In certain embodiments, the web site server 204 is accessible to a search engine provider 208 over the Internet 210, or similar network available to potential consumers of goods and services offered by the primary entity. In certain embodiments, webpages hosted on servers 209 of third-party entities, such as entities that are competitors of the primary entity, are also accessible through the search engine provider 208. In certain embodiments, the search engine provider 208 independently accesses the webpages of the website server 204, including the targeted landing page 206, and the webpages hosted on servers 209, and applies an algorithm to rank the webpages with respect to one another. Frequently, search engine providers do not make details of such algorithms available to the public and, therefore, it may be difficult to tailor the on-page content of the targeted landing page to increase its ranking. However, certain aspects of the present invention recognize that most search engine ranking algorithms may be influenced by the words used in the on-page content of the webpages.

FIG. 2 also illustrates exemplary transactions that may take place between the search engine optimizer 122 and the search engine provider 208. In certain embodiments, a primary keyword 212 may be submitted from the search engine optimizer 122 to the search engine provider 208 over the Internet 210 through, for example, a website server 204. In certain embodiments, the search engine provider 208 returns a search engine results page 214 presenting a plurality of third-party entity landing pages, shown here as LP1-LP10, and the targeted landing page TLP18 in ranked order. As will be explained in further detail herein, the search engine optimizer 122 uses the search engine results page 214 and corresponding hyperlinks to conduct a competitive analysis of keywords used on higher ranking websites. In certain embodiments, the competitive analysis identifies secondary keywords that may be included in the targeted, LP18, to elevate its ranking with respect to the third-party landing pages LP1-LP10.

Figure 3:
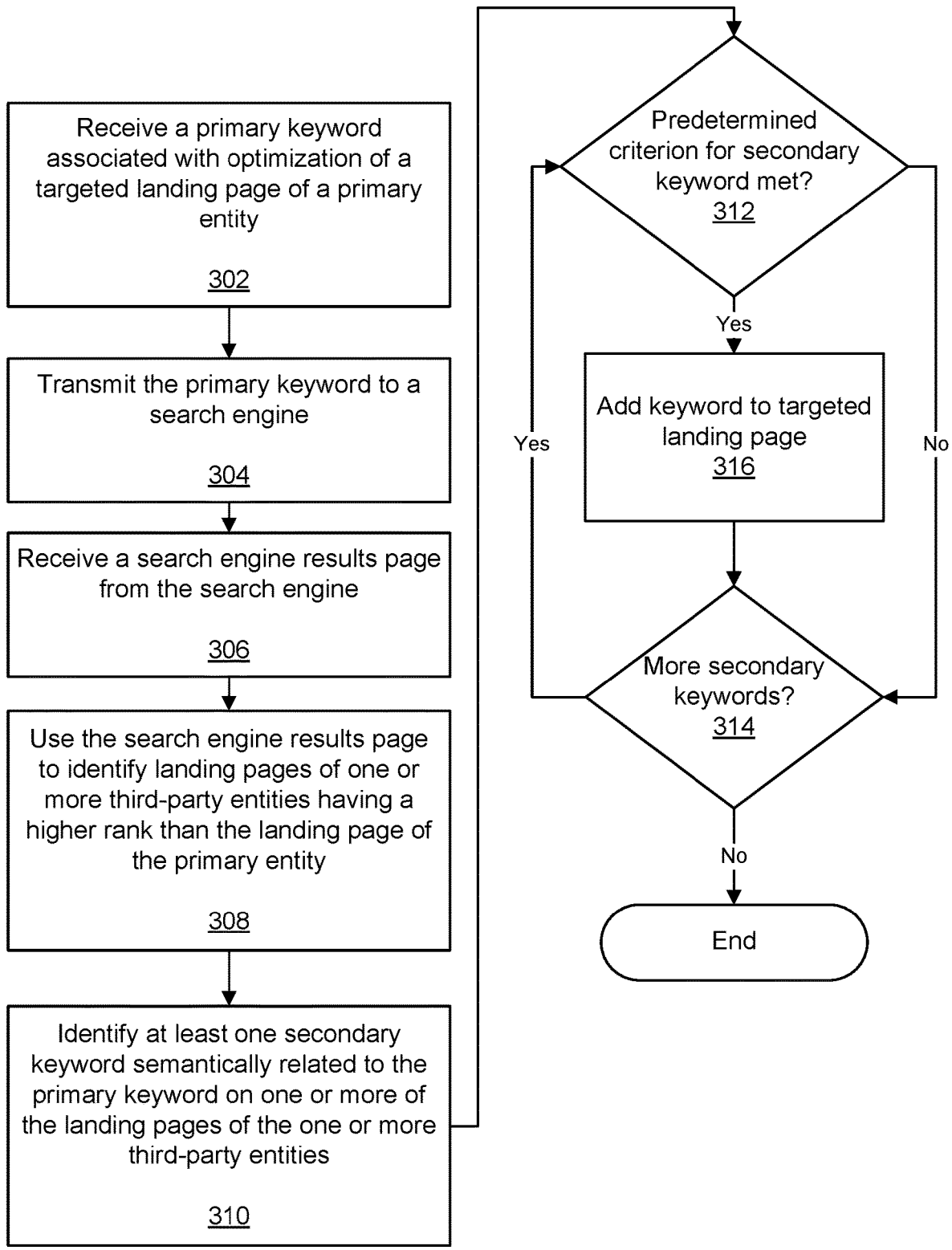
FIG. 3 is a flowchart depicting exemplary operations that may be executed by certain embodiments of the search engine optimizer.

FIG. 3 is a flowchart depicting exemplary operations that may be executed by certain embodiments of the search engine optimizer. In this example, a primary keyword associated with the targeted landing page of the primary entity is received at operation 302. In certain embodiments, the primary keyword may be a keyword already existing in the on-page content of the targeted landing page. In certain embodiments, the primary keyword may be a keyword that does not exist on the targeted landing page, but which a user believes may be relevant to the goods or services offered by the primary entity.

In the illustrated example, the primary keyword is transmitted at operation 304 to a search engine accessible by consumers of goods or services offered by the primary entity. In certain embodiments, the search engine is a public search engine available through a search engine provider such as Google®, Bing®, etc. In certain embodiments, the search engine responds to the primary keyword query with a search engine results page, such as the search engine results page 214 of FIG. 2.

At operation 308, the search engine results page may be used to identify landing pages of one or more third-party entities having a higher rank than the landing page of the primary entity. With reference to the search engine results page 214, third party landing pages LP1-LP10 have a ranking higher than the targeted landing page TLP18. For purposes of the following examples, it is assumed that the primary entity seeks to increase the rank of the targeted landing page TLP18 so that it reaches a rank currently held by one of the third-party landing pages LP1-LP10. In certain embodiments, the search engine optimizer identifies all of the third-party landing pages that are ranked higher than the targeted landing page for further processing. In certain embodiments, the search engine optimizer only identifies a predetermined number of higher ranking, third-party landing pages for further processing. As an example, the top ten ranked landing pages LP1-LP10 may be identified by the search engine optimizer for further processing, while landing pages ranked below LP10 are ignored.

In certain embodiments, the search engine optimizer retrieves one or more of the third-party landing pages LP1-LP10 at operation 310 and extracts the content of the retrieved pages to identify secondary keywords semantically related to the primary keyword. Certain embodiments may employ web scraping, web harvesting, or web data extraction to extract potential keywords from the third-party landing pages. In certain embodiments, web scraping a landing page involves downloading the landing page using the hyperlink provided in the search engine report page and extracting words and phrases from the downloaded landing page. Once downloaded, the content of a landing page may be parsed, searched, reformatted, copied into a spreadsheet, etc., for further processing. In certain embodiments, the contents of the third-party landing pages may be web scraped directly from the third-party's server without completely downloading the landing page.

In certain embodiments, potential secondary keywords in the third-party landing pages are identified at operation 310 using word sense disambiguation techniques. In certain embodiments, a Lesk algorithm may be applied to the content of the third-party landing pages to identify the potential secondary keywords. Certain implementations of the Lesk algorithm are based on the assumption that words in a given section of text tend to share a common topic. A simplified version of the Lesk algorithm includes comparing the dictionary definition of an ambiguous word with the terms contained in its proximity.

Certain embodiments of the search engine optimizer may employ an Extended Lesk algorithm to the content of the third-party landing pages. In certain implementations of the Extended Lesk algorithm, a work vector is created that corresponds to every content word in a WordNet gloss. In certain implementations, concatenating glosses of related concepts in WordNet can be used to augment the working vector. In certain implementations, the vector contains the co-occurrence counts of words co-occurring with the working vector in a large corpus. By adding all the word vectors for all content words in the gloss, a gloss vector may be obtained for the concept. Relatedness between the primary keyword and the potential secondary keyword may be determined by comparing the gloss vector using, for example, the Cosine similarity measure.

In certain embodiments, each secondary keyword identified in operation 310 is analyzed at operation 312 to determine whether the secondary keyword meets a predetermined criterion. In certain embodiments, the predetermined criterion are selected based on a determination that inclusion of the secondary keyword in the targeted landing page will increase the ranking of the targeted landing page by the search engine. If it is determined that the secondary keyword will not increase the ranking of the targeted landing page, the search engine optimizer may continue to retrieve further secondary keywords at operation 314 and apply the predetermined criterion at operation 312 until all, or substantially all, secondary keywords have been analyzed.

In the illustrated example, if it is determined at operation 312 that the secondary keyword meets the predetermined criterion, the secondary keyword may be added to the targeted landing page at operation 316. In certain embodiments, the secondary keyword is provided as a suggested keyword to a human operator at a user interface. In certain embodiments, the human operator may manually edit the targeted landing page to include the suggested secondary keyword. In certain embodiments, the secondary keyword may be automatically added to one or more portions of the on-page content of the targeted landing page. As an example, an automated HTML editor may be programmed to add secondary keywords meeting the predetermined criterion to the keyword portion of the HTML content of the targeted landing page. In other examples, the automated HTML editor may be programmed to add such secondary keywords to other portions of the on-page content of the targeted landing page. It will be recognized, based on the teachings of the present disclosure, that the on-page content of the targeted landing page may be modified in various manners in response to the identification of secondary keywords to boost the ranking of the targeted landing page.

Figure 4:
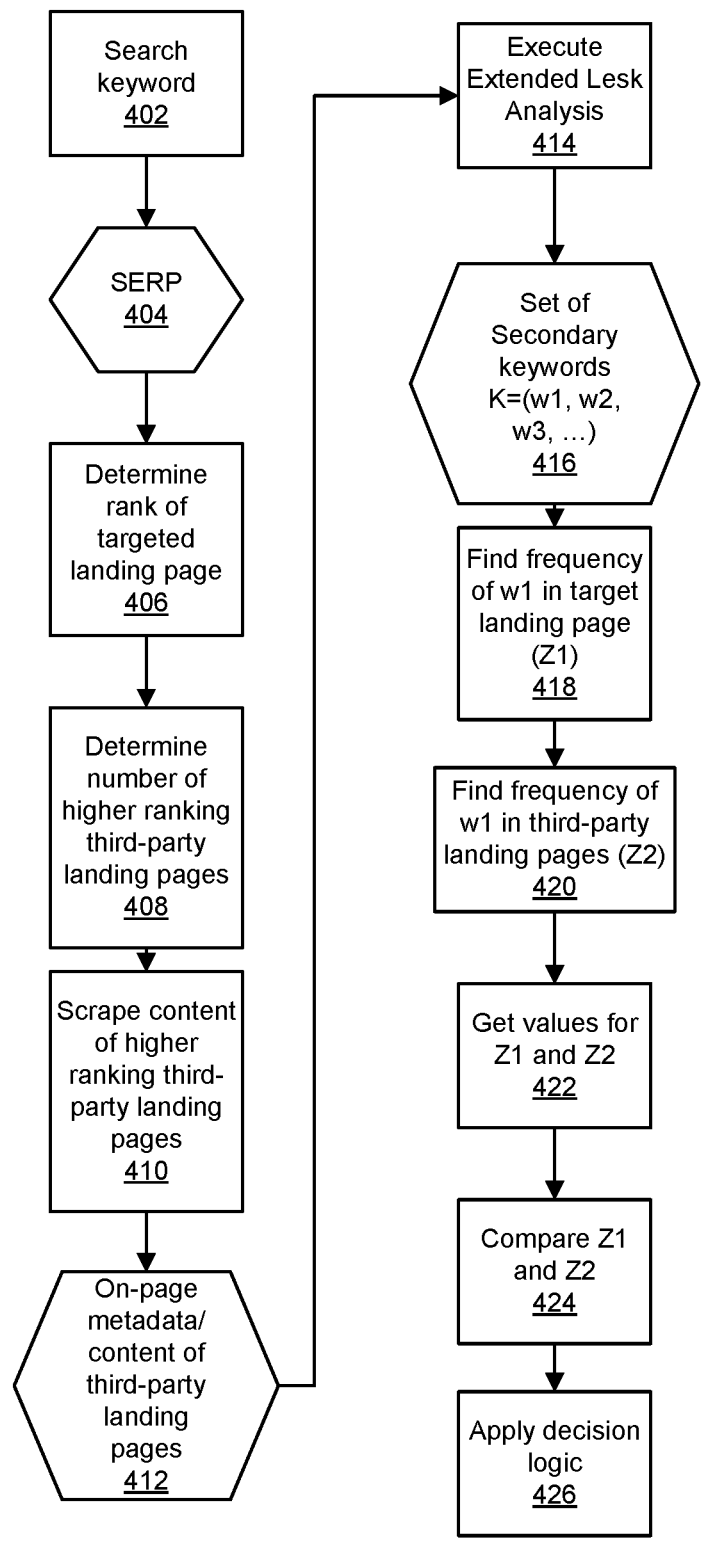
FIG. 4 is another flowchart depicting exemplary operations that may be executed by certain embodiments of the search engine optimizer.

FIG. 4 is another flowchart depicting exemplary operations that may be executed by certain embodiments of the search engine optimizer. In certain embodiments, a search request using the primary keyword is submitted to a search engine at operation 402 and a search engine results page 404 is returned. In the illustrated example, the rank of the targeted landing page is determined at operation 406 using the search engine results page 404. In certain embodiments, the number of higher ranking third-party landing pages is determined at operation 408. As described above, the number of higher ranking landing pages may include all of the higher ranking landing pages or a subset thereof. In certain embodiments, the number of higher ranking landing pages may be filtered based on whether the higher ranking landing page is that of a competitor so that only competing landing pages are subject to further processing.

In the example shown in FIG. 4, the content of the higher ranking third-party landing pages may be web scraped at operation 410 to extract the on-page metadata/content 412 contained in the third-party landing pages. In certain embodiments, an Extended Lesk algorithm is applied to the extract the on-page metadata/content 412 at operation 414 to obtain a set of secondary keywords 416 semantically related to the primary keyword. In certain embodiments, the secondary keywords 416 extracted using the Extended Lesk algorithm may include a set of secondary keywords, $K=(w_1, w_2, w_3, \ldots)$. In certain embodiments, each secondary keyword $w_n$ in set K is the subject of an analysis to determine whether inclusion of the secondary keyword $w_n$ is likely to increase the ranking of the targeted landing page.

Certain embodiments start the analysis using keyword $w_1$. In the example shown in FIG. 4, the frequency, Z1, with which the secondary keyword $w_1$ is used on the targeted landing page is determined at operation 418, and the frequency, Z2, with which the secondary keyword $w_1$ is used on the third-party landing pages is determined at operation 420. In certain embodiments, the frequency Z2 may be the average number of times the secondary keyword $w_1$ appears in all of the third-party landing pages. As an example, if the secondary keyword $w_1$ appears a total of 20 times on 10 higher ranking third-party landing pages, then Z2=2. In certain embodiments, the frequency values for Z1 and Z2 are compared at operation 424. Certain embodiments use the comparison of the frequency values to determine which decision logic operations occur at 426. It will be understood, based on the teachings of the present disclosure, that the decision logic at operation 426 may be implemented in a variety of manners, with the goal of determining whether inclusion of the secondary keyword under analysis (e.g., $w_1$) in the on-page content of the targeted landing page is likely to increase the ranking of the targeted landing page by the search engine results using the primary keyword.

Figure 5:
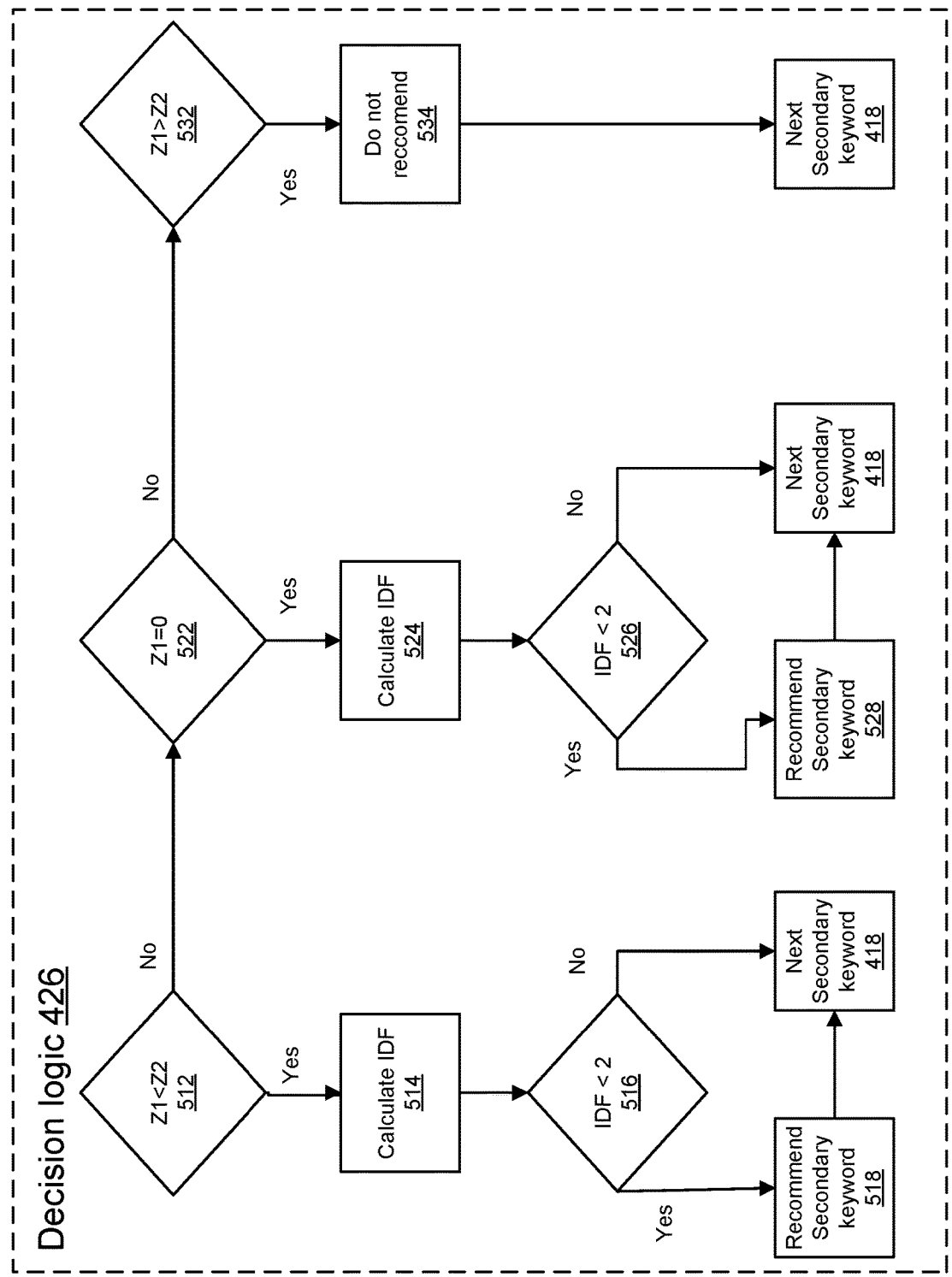
FIG. 5 is a flowchart depicting exemplary operations that may be executed to implement the decision logic of the search engine optimizer.

FIG. 5 is a flowchart depicting exemplary operations that may be executed to implement the decision logic of operation 426. In certain embodiments, if Z1<Z2 at operation 512, an inverse document frequency (IDF) is determined at operation 514. As used herein, the value of the IDF is equal to the total number of third-party landing pages that have been analyzed divided by the total number of third-party landing pages containing the secondary keyword. To this end, $$IDF = \frac{\text{Total Number of Third Party Landing Pages Analyzed}}{\text{Number of Third Party Landing Pages containing secondary keyword}}$$

In certain embodiments, the IDF is compared to a predetermined threshold value at operation 516 to determine whether the secondary keyword should be recommended for inclusion in the targeted landing page. In certain embodiments, a lower value for the IDF indicates that inclusion of the secondary keyword is more likely to increase the search engine ranking of the targeted landing page. In the illustrated example, the predetermined threshold is 2, although this value may be selected as a matter of design choice based on the teachings of the present disclosure. If the value of IDF<2, the secondary keyword is recommended for inclusion in the targeted landing page at operation 518. As noted above, inclusion of the secondary keyword in the targeted landing page may proceed in various manners involving one or both of manual editing of the HTML content of the targeted landing page or programmatic automated editing of the HTML content. After recommending the secondary keyword at operation 518, analysis may proceed to operation 418 (FIG. 4) using the next secondary keyword in the set, K, if any. In certain embodiments, if IDF is not less than the predetermined threshold value (e.g., 2), analysis proceeds to operation 418 (FIG. 4) using the next secondary keyword in the set, K, if any, without a recommendation of inclusion of the current secondary keyword.

In certain embodiments, if $Z1=0$ at operation 522, the IDF is determined at operation 524 and may be calculated in the same manner as at operation 514. In certain embodiments, the IDF is compared to the same or a predetermined threshold value at operation 526 to determine whether the secondary keyword should be recommended for inclusion in the targeted landing page. In the illustrated example, the predetermined threshold is 2, although this value also may be selected as a design choice based on the teachings of the present disclosure and need not be the same value used in operation 516. If IDF<2, the secondary keyword is recommended for inclusion in the targeted landing page at operation 528. As noted above, inclusion of the secondary keyword in the targeted landing page may proceed in various manners involving one or both of manual editing of the HTML content of the targeted landing page or programmatic automated editing of the HTML content. After recommending the secondary keyword at operation 528, analysis may proceed to operation 418 (FIG. 4) using the next secondary keyword in the set K, if any. In certain embodiments, if the IDF is not less than the predetermined threshold value (e.g., not <2), analysis proceeds directly to operation 418 (FIG. 4) using the next secondary keyword in the set K, if any, without recommending inclusion of the current secondary keyword in the targeted landing page.

In certain embodiments, $Z1$ may be greater than $Z2$, thereby indicating that the secondary keyword is used more frequently on the targeted landing page than on the third-party landing pages. In such instances, the secondary keyword need not be recommended for further inclusion in the targeted landing page or may otherwise be ignored at operation 534. In certain embodiments, the analysis then proceeds to operation 418 (FIG. 4) using the next secondary keyword in the set K, if any.

The operations shown in FIGS. 4 and 5 may be understood with respect to the following practical example. At operation 402, a user searches for the primary keyword "Laptop" on Google, which returns a search engine results page 404 for the primary keyword "Laptop." In one example, the targeted landing page is ranked 18th in the search engine report page for the primary keyword (see, e.g., TLP18 of search engine results page 214 in FIG. 2) as determined at operation 406. In one example, the goal is to optimize the rank of the targeted landing page so that the targeted landing page is within the top ten landing pages that are returned by the search engine in response to a search of the primary keyword "Laptop." As such, the landing pages found in the top ten landing pages of the search engine report page (see, e.g., LP1-LP10 of search engine results page 214 in FIG. 2) are subject to a competitive analysis to identify secondary keywords that may be included in the targeted landing page to increase its ranking at operation 408.

In this example, the top ten ranked landing pages are web scraped to extract their on-page content at operation 410 to generate on-page metadata/content 412 of the landing pages. An Extended Lesk algorithm may be executed on the on-page metadata/content 412 of the landing pages at operation 414 to obtain a set of secondary keywords 416 that are semantically related to the primary keyword 'Laptop.' In this example, it is assumed that the set of secondary keywords, K, for "Laptop"={System, Notebook, personal system}. Although the particular order in which the secondary keywords are analyzed is a matter of design choice based on the teachings of the present disclosure, the first secondary keyword of the set K that is analyzed in this example is the word "System." At operation 418, it is assumed that the frequency of the occurrence of the word "System" ($Z1$) on the targeted landing page is, for example, 3, and the average frequency of the occurrence of the word "System" ($Z2$) in the top ten landing pages (LP1-LP10) is, for example, 7. In certain embodiments, the values for $Z1$ and $Z2$ are obtained at operation 422 and compared at operation 424 pursuant to executing the decision logic shown, for example, in FIG. 5.

With respect to the word "System," $Z1<Z2$ at operation 512. Accordingly, a value for IDF is calculated at operation 514. For purposes of this example, it is assumed that six of the ten landing pages LP1-LP10 have the secondary keyword "System." Accordingly, the IDF value for the secondary keyword 'System' is 10/6=1.66, which is less than the predetermined threshold value of 2 at operation 516. Therefore, the secondary keyword "System" is recommended for inclusion in the targeted landing page at operation 518.

At operation 418, analysis proceeds using the secondary keyword "Notebook" of the set of secondary keywords, K. At operation 418, it is assumed that the frequency of the occurrence of the word "Notebook" ($Z1$) on the targeted landing page is, for example, 0, and the average frequency of the occurrence of the word "Notebook" ($Z2$) in the top ten landing pages (LP1-LP10) is, for example, 8. In certain embodiments, the values for $Z1$ and $Z2$ are obtained at operation 422 and compared at operation 424 pursuant to executing the decision logic shown, for example, in FIG. 5.

With respect to the word "Notebook," $Z1=0$ at operation 522. For purposes of this example, it is assumed that eight of the ten landing pages LP1-LP10 have the secondary keyword "Notebook." Accordingly, the IDF value for the secondary keyword 'Notebook is 10/8=1.25, which is less than the predetermined threshold value of 2 at operation 528. Therefore, the secondary keyword "Notebook" is recommended for inclusion in the targeted landing page at operation 528.

In this example, the analysis proceeds to operation 418 using the next secondary keyword in the set of secondary keywords K. Here, the next secondary keyword is "personal system." In this example, it is assumed that the frequency of occurrence, $Z1$, of the secondary keyword on the targeted landing page is 4, while the average frequency of occurrence, $Z2$, of the secondary keyword on the competitor landing pages, L1-L10, is 2. Accordingly, $Z1>Z2$ and the secondary keyword "personal system" is not recommended for inclusion in the targeted landing page. Since there are no further secondary keywords in the set of secondary keywords K, competitive analysis of landing pages LP1-LP10 has been completed with respect to the primary keyword "Laptop."

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implemented method for improving search engine ranking of a landing page, comprising:
   receiving, at a user interface, a primary keyword associated with a targeted landing page of a primary entity;
   transmitting the primary keyword to a search engine;
   receiving a search engine results page from the search engine;
   using the search engine results page to identify landing pages of one or more third-party entities having a higher rank than the targeted landing page;
   identifying one or more secondary keywords semantically related to the primary keyword on one or more higher-ranking landing pages of the one or more third-party entities, wherein the identifying includes
   scraping the one or more higher-ranking landing pages of the one or more third-party entities, and
   executing a semantic analysis on scraped content of the one or more higher-ranking landing pages of the one or more third-party entities to identify one or more secondary keywords semantically related to the primary keyword, the semantic analysis comprising using a word sense disambiguation technique on the scraped content, the using the word sense disambiguation technique comprising applying a Lesk algorithm to the scraped content, the Lesk algorithm including comprising a dictionary definition of an ambiguous word in the scraped content with terms contained in proximity of the ambiguous word in the scraped content;
   determining whether inclusion of one or more of the secondary keywords in the targeted landing page will increase ranking of the targeted landing page in the search engine;
   retrieving additional secondary keywords when it is determined that the secondary keyword does not increase the ranking of the targeted landing page in the search engine; and,
   adding the additional secondary keywords to the targeted landing page when it is determined that inclusion of the additional secondary keywords increases the ranking of the targeted landing page in the search engine.

2. The computer-implemented method of claim 1, further comprising:
   adding a secondary keyword of the one or more secondary keywords to the targeted landing page when inclusion of the secondary keyword in the targeted landing webpage meets one or more predetermined criterion indicating addition of the secondary keyword will increase ranking of the targeted landing page in the search engine.

3. The computer-implemented method of claim 2, wherein
   a secondary keyword of the one or more secondary keywords is automatically added to the targeted landing page when inclusion of the secondary keyword in the targeted landing page meets one or more predetermined criterion indicating addition of the secondary keyword will increase ranking of the targeted landing page in the search engine.

4. The computer-implemented method of claim 1, wherein determining whether inclusion of a secondary keyword of the one or more secondary keywords in the targeted landing page will increase ranking of the targeted landing page in the search engine comprises:
   determining a frequency ($Z1$) of occurrences of the secondary keyword on the targeted landing page;
   determining an average frequency ($Z2$) of occurrence of the secondary keyword on the landing pages of the one or more third-party entities; and
   processing the secondary keyword as having a higher confidence criterion when $Z1<Z2$.

5. The computer-implemented method of claim 1, wherein determining whether inclusion of a secondary keyword of the one or more secondary keywords in the targeted landing page will increase ranking of the targeted landing page in the search engine comprises:
   determining an inverse document frequency for the secondary keyword; and
   comparing the inverse document frequency of the secondary keyword to a predetermined threshold value.

6. The computer-implemented method of claim 1, wherein determining whether inclusion of a secondary keyword of the one or more secondary keywords in the targeted landing page will increase ranking of the targeted landing page in the search engine comprises:
   determining a frequency ($Z1$) of occurrences of the secondary keyword on the targeted landing page;

determining an average frequency (Z2) of occurrence of the secondary keyword on the landing pages of the one or more third-party entities;

when a difference Z2−Z1 is greater than a predetermined threshold, determining an inverse document frequency for the secondary keyword;

comparing the inverse document frequency of the secondary keyword to a predetermined threshold value; and adding the secondary keyword to the targeted landing page if the inverse document frequency is below the predetermined threshold value.

7. The computer-implemented method of claim 1, wherein identifying at least one secondary keyword semantically related to the primary keyword comprises:

executing an extended Lesk analysis on the scraped content of the one or more higher-ranking webpages, the extended Lesk analysis creating a word vector that corresponds to a content word in a WordNet gloss.

8. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

receiving, at a user interface, a primary keyword associated with a targeted landing page of a primary entity;

transmitting the primary keyword to a search engine;

receiving a search engine results page from the search engine;

using the search engine results page to identify landing pages of one or more third-party entities having a higher rank than the targeted landing page;

identifying one or more secondary keywords semantically related to the primary keyword on one or more higher-ranking landing pages of the one or more third-party entities, wherein the identifying includes scraping the one or more higher-ranking landing pages of the one or more third-party entities, and executing a semantic analysis on scraped content of the one or more higher-ranking landing pages of the one or more third-party entities to identify one or more secondary keywords semantically related to the primary keyword, the semantic analysis comprising using a word sense disambiguation technique on the scraped content, the using the word sense disambiguation technique comprising applying a Lesk algorithm to the scraped content, the Lesk algorithm including comprising a dictionary definition of an ambiguous word in the scraped content with terms contained in proximity of the ambiguous word in the scraped content;

determining whether inclusion of one or more of the secondary keywords in the targeted landing page will increase ranking of the targeted landing page in the search engine;

retrieving additional secondary keywords when it is determined that the secondary keyword does not increase the ranking of the targeted landing page in the search engine; and, adding the additional secondary keywords to the targeted landing page when it is determined that inclusion of the additional secondary keywords increases the ranking of the targeted landing page in the search engine.

9. The system of claim 8, wherein the instructions are further configured for:

adding a secondary keyword of the one or more secondary keywords to the targeted landing page when inclusion of the secondary keyword in the targeted landing page meets one or more predetermined criterion indicating addition of the secondary keyword will increase ranking of the targeted landing page in the search engine.

10. The system of claim 9, wherein a secondary keyword of the one or more secondary keywords is automatically added to the targeted landing page when inclusion of the secondary keyword in the targeted landing page meets one or more predetermined criterion indicating addition of the secondary keyword will increase ranking of the targeted landing page in the search engine.

11. The system of claim 8, wherein determining whether inclusion of a secondary keyword of the one or more secondary keywords in the targeted landing page will increase ranking of the targeted landing page in the search engine comprises:

determining a frequency (Z1) of occurrences of the secondary keyword on the targeted landing page;

determining an average frequency (Z2) of occurrence of the secondary keyword on the landing pages of the one or more third-party entities; and processing the secondary keyword as having a higher confidence criterion when Z1<Z2.

12. The system of claim 8, wherein determining whether inclusion of a secondary keyword of the one or more secondary keywords in the targeted landing page will increase ranking of the targeted landing page in the search engine comprises:

determining an inverse document frequency for the secondary keyword; and comparing the inverse document frequency of the secondary keyword to a predetermined threshold value.

13. The system of claim 8, wherein determining whether inclusion of a secondary keyword of the one or more secondary keywords in the targeted landing page will increase ranking of the targeted landing page in the search engine comprises:

determining a frequency (Z1) of occurrences of the secondary keyword on the targeted landing page;

determining an average frequency (Z2) of occurrence of the secondary keyword on the landing pages of the one or more third-party entities;

when a difference Z2−Z1 is greater than a predetermined threshold, determining an inverse document frequency for the secondary keyword;

comparing the inverse document frequency of the secondary keyword to a predetermined threshold value; and adding the secondary keyword to the targeted landing page if the inverse document frequency is below the predetermined threshold value.

14. The system of claim 8, wherein identifying at least one secondary keyword semantically related to the primary keyword comprises:

executing an extended Lesk analysis on the scraped content of the one or more higher-ranking webpages, the extended Lesk analysis creating a word vector that corresponds to a content word in a WordNet gloss.

15. A non-transitory, computer-readable storage medium embodying computer program code, the computer program code comprising computer executable instructions configured for:
- receiving, at a user interface, a primary keyword associated with a targeted landing page of a primary entity;
- transmitting the primary keyword to a search engine;
- receiving a search engine results page from the search engine;
- using the search engine results page to identify landing pages of one or more third-party entities having a higher rank than the targeted landing page;
- identifying one or more secondary keywords semantically related to the primary keyword on one or more of higher-ranking landing pages of the one or more third-party entities, wherein the identifying includes
- scraping the one or more higher-ranking landing pages of the one or more third-party entities, and
- executing a semantic analysis on scraped content of the one or more higher-ranking landing pages of the one or more third-party entities to identify one or more secondary keywords semantically related to the primary keyword, the semantic analysis comprising using a word sense disambiguation technique on the scraped content, the using the word sense disambiguation technique comprising applying a Lesk algorithm to the scraped content, the Lesk algorithm including comprising a dictionary definition of an ambiguous word in the scraped content with terms contained in proximity of the ambiguous word in the scraped content;
- determining whether inclusion of one or more of the secondary keywords in the targeted landing page will increase ranking of the targeted landing page in the search engine;
- retrieving additional secondary keywords when it is determined that the secondary keyword does not increase the ranking of the targeted landing page in the search engine; and,
- adding the additional secondary keywords to the targeted landing page when it is determined that inclusion of the additional secondary keywords increases the ranking of the targeted landing page in the search engine.

16. The non-transitory, computer-readable storage medium of claim 15, wherein the instructions are further configured for:
- adding a secondary keyword of the one or more secondary keywords to the targeted landing page when inclusion of the secondary keyword in the targeted landing page meets one or more predetermined criterion indicating addition of the secondary keyword will increase ranking of the targeted landing page in the search engine.

17. The non-transitory, computer-readable storage medium of claim 15, wherein determining whether inclusion of a secondary keyword of the one or more secondary keywords in the targeted landing page will increase ranking of the targeted landing page in the search engine comprises:
- determining a frequency (Z1) of occurrences of the secondary keyword on the targeted landing page;
- determining an average frequency (Z2) of occurrence of the secondary keyword on the landing pages of the one or more third-party entities; and
- processing the secondary keyword as having a higher confidence criterion when $Z1<Z2$.

18. The non-transitory, computer-readable storage medium of claim 15, wherein determining whether inclusion of a secondary keyword of the one or more secondary keywords in the targeted landing page will increase ranking of the targeted landing page in the search engine comprises:
- determining an inverse document frequency for the secondary keyword; and
- comparing the inverse document frequency of the secondary keyword to a predetermined threshold value.

19. The non-transitory, computer-readable storage medium of claim 15, wherein determining whether inclusion of a secondary keyword of the one or more secondary keywords in the targeted landing page will increase ranking of the targeted landing page in the search engine comprises:
- determining a frequency (Z1) of occurrences of the secondary keyword on the targeted landing page;
- determining an average frequency (Z2) of occurrence of the secondary keyword on the landing pages of the one or more third-party entities;
- when a difference $Z2-Z1$ is greater than a predetermined threshold,
- determining an inverse document frequency for the secondary keyword;
- comparing the inverse document frequency of the secondary keyword to a predetermined threshold value; and
- adding the secondary keyword to the targeted landing page if the inverse document frequency is below the predetermined threshold value.

20. The non-transitory, computer-readable storage medium of claim 15, wherein identifying at least one secondary keyword semantically related to the primary keyword comprises:
- executing an extended Lesk analysis on the scraped content of the one or more higher-ranking webpages, the extended Lesk analysis creating a word vector that corresponds to a content word in a WordNet gloss.

* * * * *